Nov. 14, 1967 E. P. TOMASZEK 3,352,168
MECHANICAL SERVO SYSTEM UTILIZING CASCADED
DIFFERENTIAL TOROIDAL DRIVES
Filed Feb. 1, 1966 5 Sheets-Sheet 1
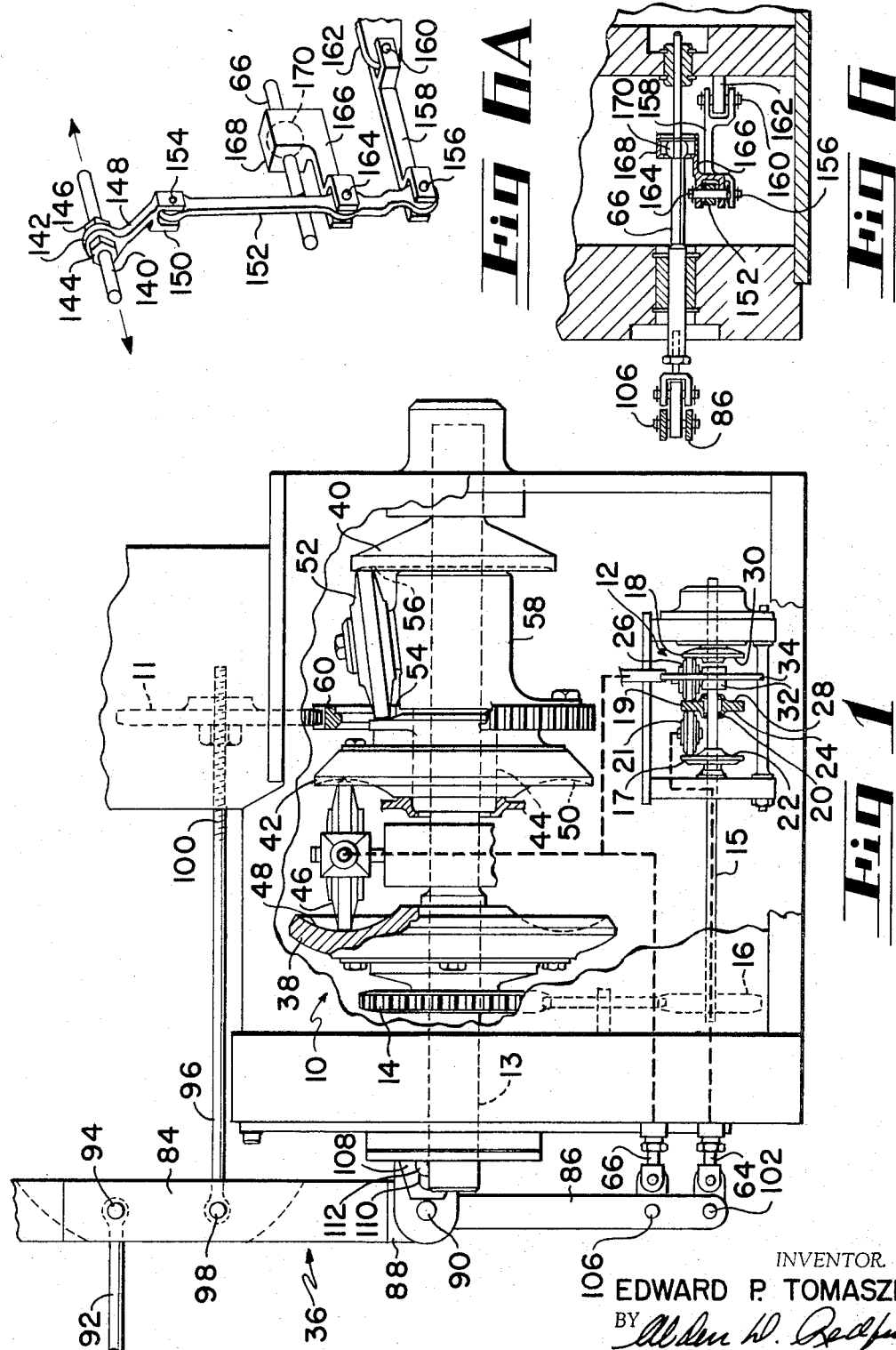
INVENTOR.
EDWARD P. TOMASZEK
BY
ATTORNEYS.

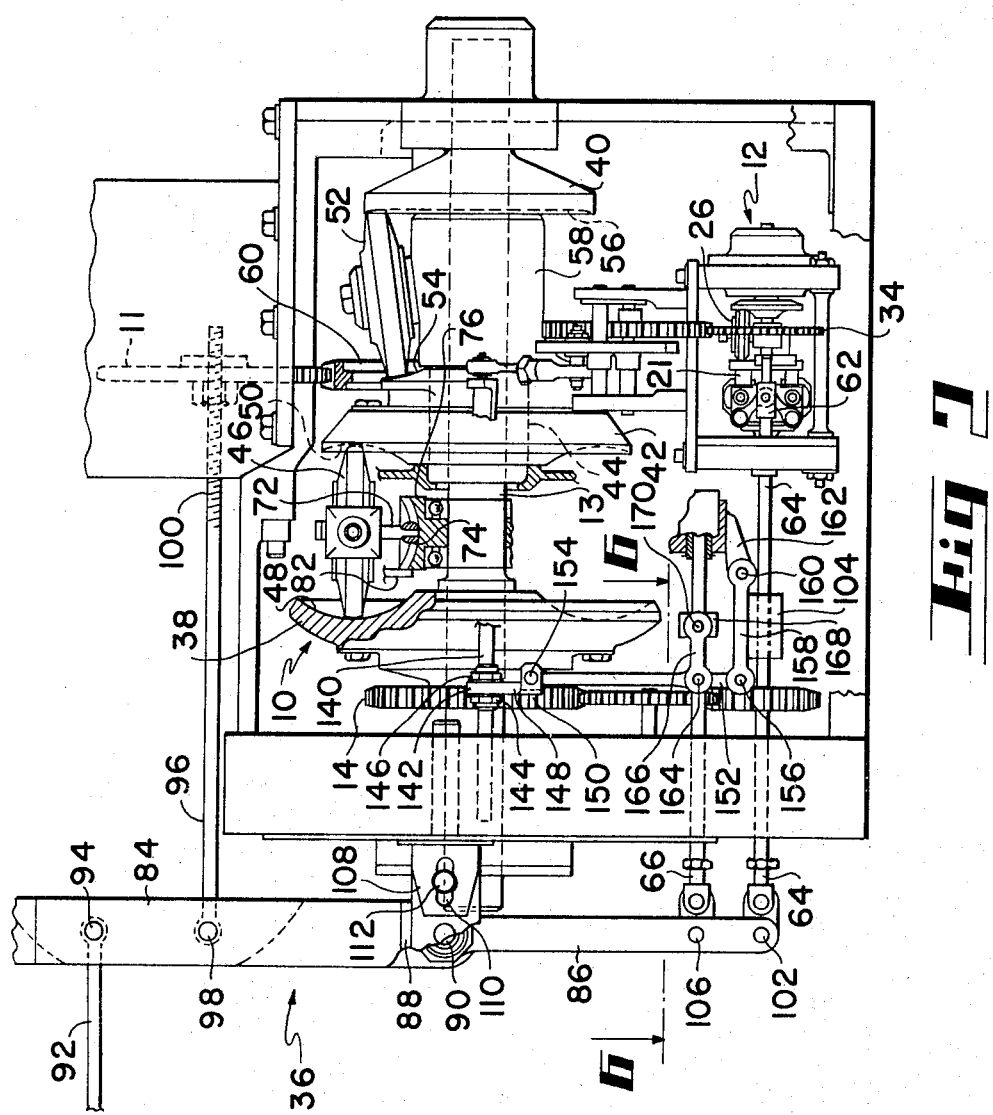

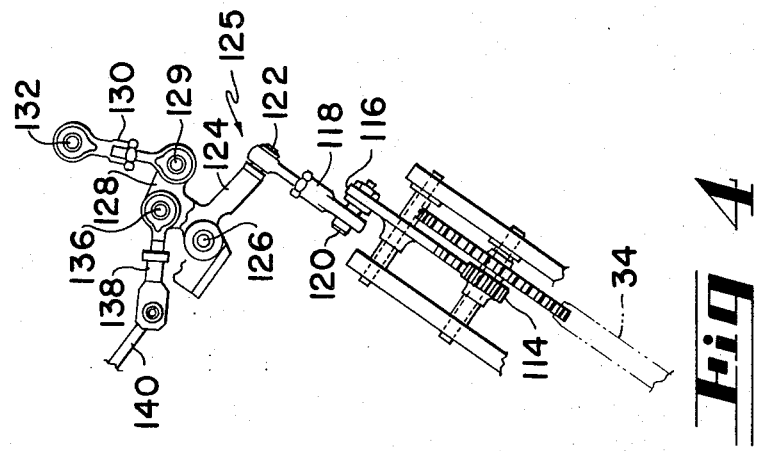
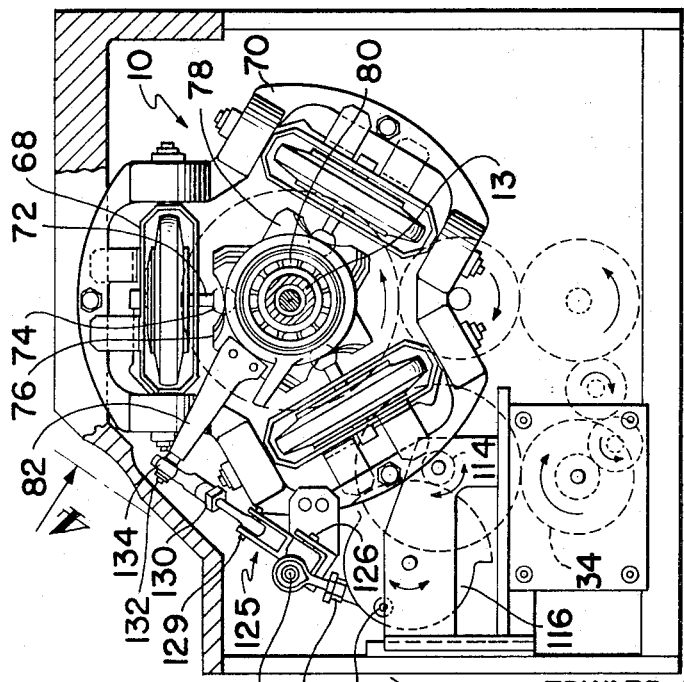

Nov. 14, 1967  E. P. TOMASZEK  3,352,168
MECHANICAL SERVO SYSTEM UTILIZING CASCADED
DIFFERENTIAL TOROIDAL DRIVES
Filed Feb. 1, 1966  5 Sheets-Sheet 4

INVENTOR.
EDWARD P. TOMASZEK
BY
ATTORNEYS.

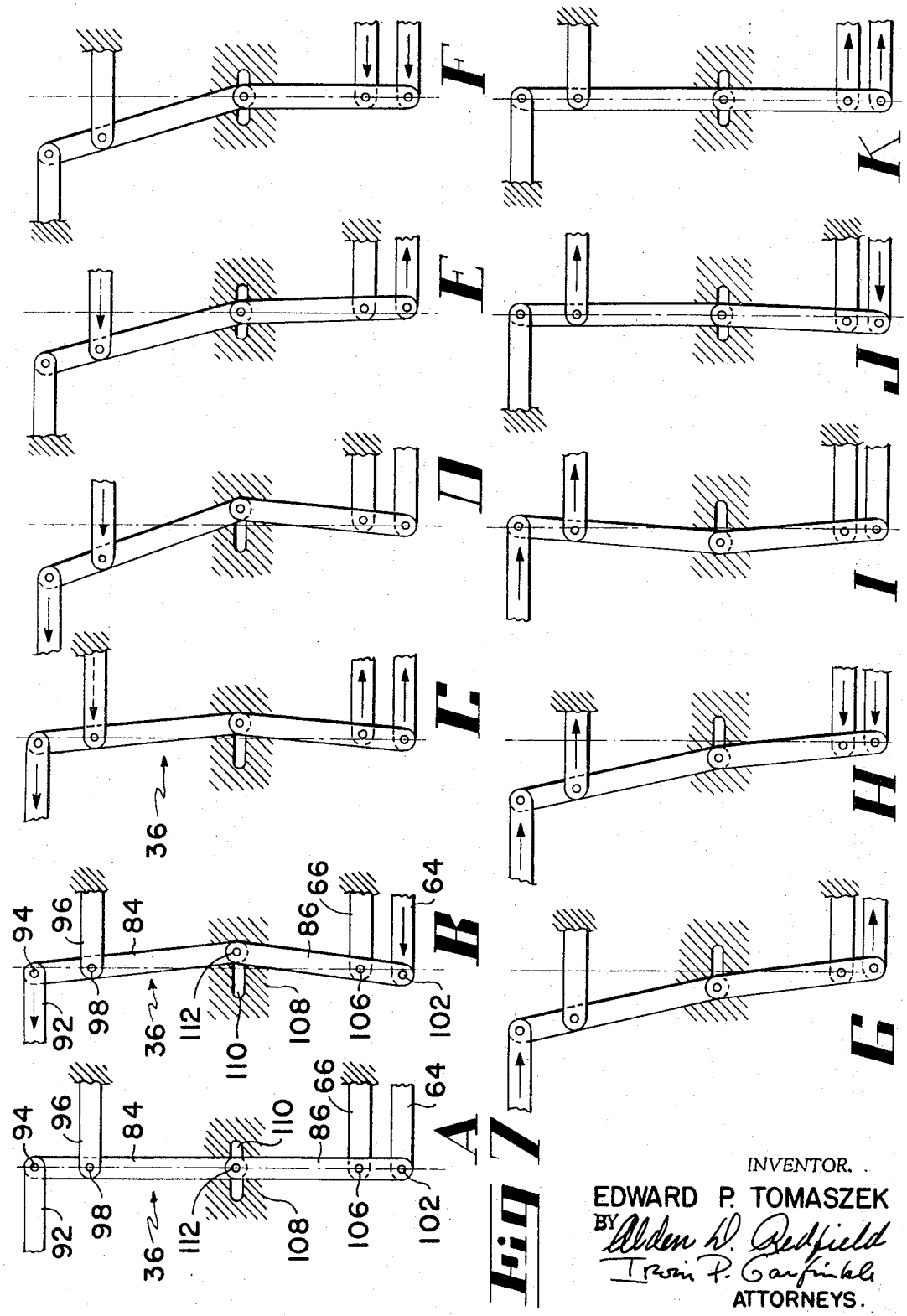

United States Patent Office 3,352,168
Patented Nov. 14, 1967

3,352,168
MECHANICAL SERVO SYSTEM UTILIZING CASCADED DIFFERENTIAL TOROIDAL DRIVES
Edward P. Tomaszek, Shelton, Conn., assignor to Avco Corporation, Stratford, Conn., a corporation of Delaware
Filed Feb. 1, 1966, Ser. No. 524,104
8 Claims. (Cl. 74—190.5)

This invention relates to a mechanical servo system which functions to provide a positional output for a positional input. The invention finds particular utility in controlling the ailerons of an airplane, although it may be used in any environment where a precise positional output must be obtained from a positional input.

According to this invention a servo system is provided in which two infinitely variable ratio toroidal-type transmission differentials are cascaded; i.e., the output of one of the differentials is applied to the input control of the other. Basically, each differential is an integrating device producing a velocity output from a positional input. The two variable ratio transmission differentials in series result in a double integration so that for a positional input signal, an acceleration output would be derived. However, two feedback mechanisms are used, one from the output of each differential to automatically null out the error signal such that, for a given positional input, a positional output is obtained.

It is an object of this invention to provide an all mechanical servo system requiring minimal control forces by utilizing two cascaded toroidal differentials for producing a positional output for a given positional input.

Another object of this invention is to produce such a servo system utilizing a novel feedback mechanism.

For other objects and advantages of this invention, reference should now be made to the following detailed specification and to the accompanying drawings in which:

FIGURE 1 is a side view of the invention with certain parts removed and with the controls shown in schematic form;

FIGURE 2 is a side view of the invention with the cover plate of its housing removed and certain elements shown in section;

FIGURE 3 is an end view with the cover plate removed;

FIGURE 4 is a sectional view taken through the line 4—4 of FIGURE 3;

FIGURE 6 is a sectional view of certain linkages taken through the line 6—6 of FIGURE 2, FIGURE 6A showing the same linkages in perspective; and FIGURE 7A–K is a diagrammatic representation showing various intermediate steps in the operation of the control and feedback linkage.

Figure 5:
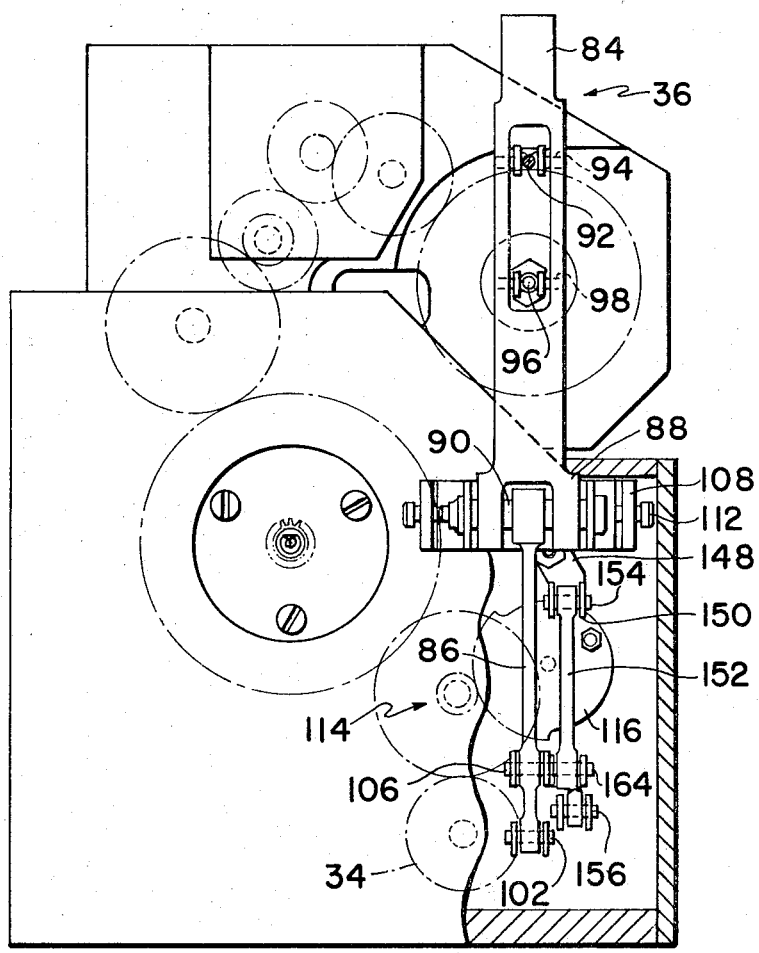
FIGURE 5 is an end view opposite from that of FIGURE 3.

Referring to FIGURE 1 of the drawings, the servo system utilizes two cascaded toroidal-type variable ratio transmission differentials, one a power differential generally indicated at 10 which serves to position an output gear 11, and the other a control differential generally indicated at 12 which serves to control the operation of the power differential 10.

In the use of the servo system for controlling the positions of the ailerons of an aircraft, the power for each of the differentials 10 and 12 was provided by the aircraft power plant (not shown) applied to the shaft 13 of the power differential 10 by means of an input gear 14 coupled thereto and to the input shaft 15 of the control differential 12 by means of gearing 16. While the shafts 13 and 15 are driven by the same power source, for a particular application the two shafts may be driven independently, or both differentials may be mounted on a common shaft. Moreover, power for the system may also be provided by any suitable source, such as an electric motor, air motor, or hydraulic motor.

As seen in FIGURE 1, the control differential 12 includes two outboard driving disks 17 and 18 axially and angularly fixed on the shaft 15. A driven intermediate disk 19 is also mounted on the shaft 15 but is freely rotatable with respect thereto on bearings 20. A pair of adjustable rollers 21 is positioned in tractive engagement between the opposed toroidal races 22 and 24 of disks 17 and 19, respectively, while a second plurality of rollers 26 is mounted in tractive relationship between the opposed races 28 and 30 of the disks 19 and 18, respectively.

The controls for the differential 12 are essentially identical to those described in the Tomaszek et al. Patent 3,030,817, which disclosure is incorporated herein by reference. Briefly, the rollers 21, which are each rotatable on its roller axis, are each adjustably mounted in that each is also rotatable about its axis of precession and its contact axis so as to change the positions of the rollers on the races; i.e., to change the ratio of the contact point radii and hence the driving ratio between the disks 17 and 19. For the purpose of this specification, the "roller axis" is that axis about which the roller rotates on the surface of the races; the "contact axis" is that axis joining the points of contact of the roller with the races of the disks, i.e., the axis about which the rollers are steered; and "axis of precession" is that axis about which the rollers are shifted or tilted to change the contact radii ratio between the races and the rollers.

The rollers 26 are non-adjustably mounted on a hub 32 which is rotatably mounted on the shaft 15. The rollers 26 carry a ring gear 34 which constitutes the output from the control differential 12. When the disk 19 is driven at the same speed by both the rollers 26 and 21, the ring gear 34 remains stationary. However, if the positions of the rollers 21 on the races 22 and 24 are shifted to provide a new driving ratio, then the rollers 26 and 21 will attempt to drive the disk 19 at different speeds, this difference being absorbed by the rollers 26 which revolve about the axis of the shaft 15 on the hub 32. The output from differential 12 is derived from ring gear 34.

The input signal to the rollers 21 is a positional input applied, as shown schematically in FIGURE 1, through input and control linkages 36 to the adjustable rollers 21. The output from the control differential 12 at the ring gear 34 is coupled to the input of the power differential 10 and is, in addition, fed back to the input and control linkage 36 in a direction tending to null out the input signal.

The power differential 10 is similar in operation to the control differential 12, differing primarily in size. The power differential has two outboard driving disks 38 and 40, which are angularly fixed to the shaft 13, and an intermediate rotatable disk 42 also mounted on the shaft 13 but which is freely rotatable with respect thereto on bearings (not shown). A set of adjustable rollers 46 is positioned in tractive engagement between the opposed toroidal races 48 and 50 of the disks 38 and 42, respectively. A second set of rollers 52 is mounted in tractive relationship between the opposed races 54 and 56 of disks 42 and 40, respectively.

The adjustable rollers 46 are rotatable on the contact axis and on the axis of precession, so that each is shiftable to a new position on the raceways to change the ratio of the contact point radii, and hence the driving ratio between the disks 38 and 42.

The rollers 52 are non-adjustably mounted on a hub 58 which is rotatably mounted on the shaft 13. When the disk 42 is driven at the same speed by both rollers 46 and 52, the system is balanced and the output gear 60 remains stationary. However, if the positions of the rollers 46 on the races 48 and 50 are shifted to provide a new driving ratio, then the rollers 46 and 52 attempt to drive the disk 42 at different speeds, this difference being absorbed by the rollers 52 which revolve about the axis of the shaft 13. The hub 58 carries a gear 60 which meshes with the output feedback gear 11. In addition, gear 60 is coupled, as schematically shown in FIGURE 1, to the input and control linkages 36 to provide a feedback tending to null out the input signal.

The over-all servo system is one in which the input signal is manually applied through the input and control linkages 36 to the adjustable rollers 21 of the control differential 12. The input to the control differential 12 results in an output at ring gear 34, and this output is applied through various linkages to the adjustable rollers 46 of the power differential 10. In addition, the rotation of the ring gear 34 provides a feedback to the input and control linkages 36, tending to null out the input signal. The application of the output signal from the control differential 12 to the adjustable roller 46 of the power differential 10 results in the rotation of the output gear 60, which provides the positional power output. The position of the output gear 60 is also fed back to the input and control linkages 36 to null out the input signal. Thus, the servo, made up of two mechanical integrators, provides a positional output for a positional input by utilizing a feedback from the output of each integrator to the input of each integrator to null out the error signal to that integrator.

Referring now to FIGURES 2-6, the control mechanism 62 for adjusting the position of the adjustable rollers 21 is not shown in detail since this mechanism is fully illustrated in the aforesaid Patent No. 3,030,817 to Tomaszek et al. It suffices to point out that horizontal linear movement of an input shaft 64 coupled to the control mechanism 62 causes each of the rollers 21 to rotate on its contact axis and on its axis of precession, and thus to assume a driving ratio determined by the position of the input shaft 64. This results in the revolving of the rollers 26 and the rotation of the ring gear 34 at a rate depending on the position of the shaft 64. The rotation of the ring gear 34 is coupled to the adjustable rollers 46 of the power differential 10, and also to a shaft 66 through mechanisms to be described in connection with FIGURES 3 and 4.

As previously noted, each of the rollers 46 is rotatable on its axis of precession and its contact axis, as well as on its roller axis. Rotation on three axes is accomplished by supporting each roller on its roller axis within a yoke 68. Each yoke 68 is in turn supported on the axis of precession from a spider 70 fixed to a part of the housing. To rotate the rollers on the contact axes, a shaft 72, extending from the roller axis of each of the rollers 46, is provided with a ball 74 which rides in a slot 76 on a control ring 78. The control ring is rotatably mounted on bearings 80 on the shaft 13, and its position is controlled by movement of a control arm 82 forming a part of the mechanism between the output gear 34 and the rollers 46. The slot 76 is at an angle with respect to both the axis of precession and the contact axis, and thus, when the control ring 78 is rotated, provides a cam action for rotating the rollers simultaneously on both of these axes.

The input and control linkages 36 are comprised of a plurality of mechanisms including an input lever 84 and a control lever 86. The input lever 84 is forked at one end 88 where a pivotal connection is made between the control lever 86 and the input lever 84 by means of a pin 90. Input signals are applied by means of a signal input rod 92 pivoted to the input lever at pin 94. Feedback from the power differential 10 is applied to the input lever 84 by means of a power feedback rod 96 pivoted at one end at pin 98 and being in threaded engagement at its other end 100 with internal threads of the output gear 11.

The control signal input shaft 64 is pivotally connected to the control lever 86 at pin 102 through a buffer mechanism 104. The control signal feedback shaft 66 is pivoted at pin 106 to the control lever 86.

It will be noted that the forked portions 88 of the input lever 84 are provided with extensions 108 carrying a pin 112. The pin 112 rides in a slot 110 in the housing to permit limited movement of the pivotal connection at the pin 90.

If it is assumed that the system is in balance, neither the output gear 11 nor the ring gear 34 is rotating. Hence, the positions of pivots 98 and 106 are fixed at that time. Thus, if an input signal is applied to the input rod 92, the input lever 84 rotates on the pivot 98, displacing pin 112 from the center of the slot 110 and moving the pin 90. This causes the control lever 86 to rotate around the pivot at pin 106. Assuming an input signal applied from left to right as shown in the drawings, the pivot point 102 is moved from left to right, thereby displacing the input shaft 64 to the right. This displacement of shaft 64 causes the rollers 21 to precess to a new position producing rotation of the ring gear 34. Rotation of the ring gear 34 causes precession of the rollers 46 of differential 10 to a new position, and in addition produces a displacement of the feedback shaft 66 in a direction tending to null out the input at shaft 64. When the position of the rollers 46 is changed, the rollers 52 revolve on the hub 58 carrying the gear 60. Rotation of gear 60 represents the bi-directional power output. A positional signal from the output gear 60 is fed back through the power feedback rod 96 to the input lever 84.

The coupling arrangement from the ring gear 34 to the adjustable rollers 46 of power differential 10 and to the control feedback shaft 66 (most clearly seen in FIGURES 3 and 4) includes reduction gearing 114 driven by the ring gear 34 and a gear segment 116 driven by the reduction gearing. An adjustable rod 118 is pivoted to the gear segment at pin 120, and as the segment is rotated through its partial turns, it is converted into reciprocating motion in the rod 118. The rod 118 is also pivotally connected at pin 122 to the arm 124 of a crank 125.

The crank 125 is pivotally connected to housing structure at pin 126. The other arm 128 of the crank has two pivotal connections; one at pin 129 is to an adjustable rod 130. The spherical joint 134 of the control arm 82 is held in a socket 132 at the opposite end of rod 130. The other pivotal connection is at pin 136 to an adjustable rod 138, which in turn is pivotally connected to a horizontally supported rod 140.

When the gear segment 116 is rotated by the ring gear 34, the adjustable rod 118 is reciprocated, causing rotation of the crank on pin 126. This results in rotation of the control arm 82, causing the adjustable rollers 46 in the power differential 10 to precess to a new driving position. It also results in the horizontal motion of the shaft 140 which is ultimately connected to the feedback shaft 66.

The connection from the rod 140 includes a collar 142 adjustably located on the rod 140 by means of nuts 144 and 146. The collar is provided with an extension 148 terminating in a fork 150 from which a link 152 is pivotally connected by means of a pin 154. The other end of the link 152 is pivotally connected at pin 156 to a link 158, the other end of which is pivotally connected at pin 160 to an extension 162 from the housing. An intermediate portion of the link 152 is pivotally connected at pin 164 to a link 166, the other end of which comprises a socket 168 for containing a ball 170 fixed on the control feedback shaft 66. Thus, when the rod 140 is horizontally displaced, the control feedback shaft 66 is also horizontally displaced in the same direction. The various pivotal connections and the ball and socket connection avoid binding which might otherwise occur as the result of complex motions of the various rods and shafts.

To better appreciate the over-all operation of the servo system, reference will now be made to the schematic representation of the input and control linkages shown in FIGURES 7A–7K. Assume that the pilot of an aircraft wishes to position the ailerons in a given position. This position will be represented by the position of the input rod 92. Thus, referring to FIGURES A through E, the pilot will move the rod 92 from the neutral position shown in A to the final position shown in E, the intermediate positions in B, C, and D being illustrated to show the sequence of events. As the rod 92 moves to the left, for example, the pivot at pin 98 is fixed since the output gear 11 has been at rest, and the position of the power feedback rod 96 is consequently fixed at that instant. Therefore, the input lever 84 rotates on the pivot 98 and the pin 112 moves to the right. Similarly, at the neutral position the position of the control feedback shaft 66 is fixed so that the lever 86 rotates around the pivot 106 and moves the input shaft 64 to the left. As soon as the input shaft 64 begins to move to the left, the control differential 12 develops an output at the ring gear 34 and the output of the ring gear 34 is fed back to the control lever 86. The feedback is in a direction tending to return the position of the pin 102 to its initial position.

At the same time, the output from the ring gear 34 is applied to the control ring 78 of the power differential 10. In FIGURE E the shaft 64 is illustrated as having returned to its initial position so that the control feedback shaft 66 is stationary and the input shaft 92 is shown as having been moved to its desired final position. However, the ring gear 34 while stationary is not in its initial position, and hence the output gear 11 of the power differential 10 continues to rotate, causing the power feedback shaft 96 to move to the left. This causes the pin 112 to move towards its initial center position and the pin 102 to move past its initial position, causing the control differential ring gear 34 to rotate in the opposite direction until such time, as shown in FIGURE F, that the linkages are positioned so that the shafts 64 and 66 are at neutral positions. In the positions shown in FIGURE F the ailerons of the airplane would be at some position for a given turn. In order to return the ailerons to neutral, the procedure is reversed, as shown in FIGURES G through K.

It will be understood when analyzing FIGURE 7 that the FIGURES A through K represent a few finite points in an over-all cycle and that there is in fact continuous motion of the various shafts and levers until such time as the system is nulled.

While the disclosed embodiment of this invention represents an operating system which was actually reduced to practice, that system was not optimized, and various modifications are contemplated. It is intended, therefore, that the invention be limited only by the annexed claims as interpreted in the light of the prior art.

I claim:

1. A servo system for positioning an output shaft in response to a positional input signal requiring minimal force, the combination comprising:

first and second variable ratio transmission differentials, each of said differentials having first and second disks angularly fixed to a rotating shaft, a third disk intermediate said first and second disks, said third disk being rotatably mounted with respect to said shaft, said first and third disks having opposed toroidal races, said second and third disks having opposed races, a set of adjustable rollers positioned in traction between the opposed races of said first and third disks, said adjustable rollers being adjustable on the axis of precession to vary the driving ratio between said first and third disks, a set of fixed rollers, and mounting means for mounting said set of fixed rollers in traction between the opposed races of said second and third disks, said mounting means being rotatable on said shaft;

positional input signal means coupling said positional input signal to said adjustable rollers of said first differential for rotating said set of adjustable rollers on said axis of precession;

a first output connection from said mounting means of said first differential to the set of adjustable rollers of said second differential to rotate said rollers on the axis of precession;

a second output connection from said mounting means of said second differential to said output shaft for positioning said output shaft;

a first feedback connection from said mounting means of said first differential to said positional signal input means tending to null said positional input signal; and a second feedback connection from said mounting means of said second differential to said positional input signal means tending to null said positional input signal.

2. The invention as defined in claim 1 wherein said positional input signal means comprises:

an input lever;

a control lever;

a pivotal connection between one end of said input lever and one end of said control lever; and a connection between the other end of said control lever and said set of adjustable rollers of said first differential, said first feedback connection being made between said mounting means of said first differential and said control lever, said second feedback connection being made between said mounting means of said second differential and said input lever, said positional input signal being applied to the other end of said input lever.

3. The invention as defined in claim 2 wherein said input and control levers are in alignment in the absence of an applied positional input signal, and wherein said positional input signal is applied by means of a first movable rod pivoted to said input lever, said input rod being normal to said input lever in the absence of said positional input signal applied thereto; and a second movable rod connected from said other end of said control lever to said first set of rollers.

4. The invention as defined in claim 3 and means for limiting the motion of said pivotal connection.

5. The invention as defined in claim 4 wherein said means for limiting the motion of said pivotal connection comprises a slot in a fixed member, said pivotal connection being slidably movable within said slot.

6. The invention as defined in claim 4 wherein each of said mounting means of said first and second differentials carries a ring gear, and wherein said output connection and said first feedback connection include the ring gear of the first differential, and wherein said second feedback connection includes said ring gear of said second differential.

7. The invention as defined in claim 5 wherein the rotary motions of said first and second ring gears are converted to linear motions, and wherein each feedback connection includes a movable rod disposed normal to the aligned position of said input and control levers.

8. The invention as defined in claim 6 wherein each of said adjustable sets of rollers is simultaneously adjustable of its contact axis and said axis of precession.

References Cited

UNITED STATES PATENTS 3,106,100  10/1963  Tomaszek et al. _____ 74—190.5
3,165,937  1/1965  Tomaszek _____ 74—190.5

MILTON KAUFMAN, *Primary Examiner.*

C. J. HUSAR, *Assistant Examiner.*